United States Patent
Ke

(10) Patent No.: US 12,130,525 B2
(45) Date of Patent: Oct. 29, 2024

(54) DISPLAY PANEL AND DISPLAY DEVICE

(71) Applicant: TCL China Star Optoelectronics Technology Co., Ltd., Guangdong (CN)

(72) Inventor: Jhongciao Ke, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/320,981

(22) Filed: May 21, 2023

(65) Prior Publication Data

US 2024/0219790 A1   Jul. 4, 2024

(30) Foreign Application Priority Data

Dec. 29, 2022  (CN) .......................... 202211706737.6

(51) Int. Cl.
G02F 1/1362 (2006.01)
(52) U.S. Cl.
CPC .............................. *G02F 1/136286* (2013.01)
(58) Field of Classification Search
CPC ............ G02F 1/134309; G02F 1/1343; G02F 1/136286
See application file for complete search history.

(56) References Cited

U.S. PATENT DOCUMENTS

| 5,659,375 A | 8/1997 | Yamashita |
| 2007/0236414 A1 | 10/2007 | Lin |
| 2015/0235596 A1* | 8/2015 | Lu .............................. G09G 3/20 345/207 |
| 2020/0073186 A1 | 3/2020 | Yang |
| 2020/0117062 A1* | 4/2020 | Kim .................. G02F 1/134336 |

FOREIGN PATENT DOCUMENTS

| CN | 110501849 A | 11/2019 |
| CN | 111856827 A | 10/2020 |
| KR | 20040084444 A | 10/2004 |

OTHER PUBLICATIONS

Chinese Office Action issued in corresponding Chinese Patent Application No. 202211706737.6 dated Sep. 7, 2024, pp. 1-8.

* cited by examiner

*Primary Examiner* — Mariam Qureshi
(74) *Attorney, Agent, or Firm* — Nathan & Associates; Menachem Nathan

(57) ABSTRACT

The present application provides a display panel and a display device. The display panel includes a main pixel electrode, a data line, a scan line and a balancing capacitance part. The balancing capacitance part includes a first balancing subpart and a second balancing subpart which are disposed corresponding to each of the subpixels. The first balancing subpart includes a first electrode and a second electrode that are connected to the main pixel electrode and one data line at one side of the main pixel electrode, respectively. The second balancing subpart includes a third electrode and a fourth electrode that are connected to the main pixel electrode and another data line at another side of the main pixel electrode, respectively.

20 Claims, 9 Drawing Sheets

DISPLAY PANEL AND DISPLAY DEVICE

TECHNICAL FIELD

The present application relates to the field of display technologies, and especially relates to a display panel and a display device.

BACKGROUND

In recent years, liquid crystal display panels still occupy a markable share in consumer markets. At present, a manner of column inversion is adopted in most of display panels, so that coupling capacitance values of data lines to a pixel electrode can be offset by two data lines disposed at a left side and a right side thereof, so as to improve picture crosstalk. However, due to influence of process precision, thin film transistors and other factors, difference in coupling capacitance values between the pixel electrode and the data lines at both sides thereof is quite large, voltage variation of the pixel electrode can not be completely offset, thus resulting in picture crosstalk in the display panels.

Therefore, there is an urgent need for a display panel and a display device to solve above technical problem.

SUMMARY

An object of the present application is to provide a display panel and a display device, which can solve a technical problem that difference in coupling capacitance values between a pixel electrode and data lines at both sides thereof is quite large, voltage variation of the pixel electrode can not be completely offset, thus resulting in picture crosstalk in display panels.

A display panel is provided by the present application, the display panel includes:

a substrate;

a plurality of subpixels disposed on the substrate and arranged in an array, each of the subpixels is defined with a main area and a subarea, a data line is disposed corresponding to the subpixels in one column, and a scan line is disposed corresponding to the subpixels in one row;

a source-drain electrode part disposed in a same layer as the data line;

a pixel electrode layer including a main pixel electrode disposed corresponding to the main area, and a subpixel electrode disposed corresponding to the subarea; and a balancing capacitance part including a first balancing subpart and a second balancing subpart which are disposed corresponding to each of the subpixels, the first balancing subpart includes a first electrode and a second electrode, the second balancing subpart includes a third electrode and a fourth electrode; the first electrode and the third electrode are electrically connected to the main pixel electrode, the second electrode is electrically connected to one data line at one side of one of the subpixels, and the fourth electrode is electrically connected to another data line at another side of the one of the subpixels;

wherein, the balancing capacitance part does not overlap with the source-drain electrode part in a direction from a layer in which the data line is disposed to the pixel electrode layer; the first electrode overlaps with the second electrode in an extending direction of the scan line, and the third electrode overlaps with the fourth electrode in the extending direction of the scan line.

In some embodiments, in the extending direction of the scan line, a portion of the second electrode is disposed at a side of the first electrode adjacent to the third electrode, and a portion of the fourth electrode is disposed at a side of the third electrode adjacent to the first electrode; the first electrode is in contact with the second electrode, and does not overlap with the second electrode in the direction from the layer in which the data line is disposed to the pixel electrode layer; the third electrode is in contact with the fourth electrode, and does not overlap with the fourth electrode in the direction from the layer in which the data line is disposed to the pixel electrode layer.

In some embodiments, in the extending direction of the scan line, a portion of the second electrode is disposed at a side of the first electrode adjacent to the third electrode, and a portion of the fourth electrode is disposed at a side of the third electrode adjacent to the first electrode; and the first electrode overlaps with the second electrode in the direction from the layer in which the data line is disposed to the pixel electrode layer, and the third electrode is spaced apart from the fourth electrode; or the third electrode overlaps with the fourth electrode in the direction from the layer in which the data line is disposed to the pixel electrode layer, and the first electrode is spaced apart from the second electrode.

In some embodiments, in the extending direction of the scan line, a first portion of the first electrode overlaps with a second portion of the second electrode and is disposed at a side of the second portion away from the second balancing subpart, and a third portion of the third electrode overlaps with a forth portion of the fourth electrode and is disposed at a side of the forth portion away from the first balancing subpart; and in a same subpixel, a length of the first portion in an extending direction of the data line gradually increases in a direction away from the second portion, a length of the second portion in the extending direction of the data line gradually decreases in a direction adjacent to the first portion, a length of the third portion in the extending direction of the data line gradually increases in a direction away from the fourth portion, and a length of the fourth portion in the extending direction of the data line gradually decreases in a direction adjacent to the third portion.

In some embodiments, outlines of the first portion, the second portion, the third portion, and the fourth portion comprise arc shape.

In some embodiments, the source-drain electrode part includes a first source-drain electrode subpart and a second source-drain electrode subpart; the first source-drain electrode subpart is correspondingly connected to the main pixel electrode, the second source-drain electrode subpart is correspondingly connected to the subpixel electrode; the first source-drain electrode subpart and the second source-drain electrode subpart includes a common connection subpart being shared by the first source-drain electrode subpart and the second source-drain electrode subpart, and a distance between the first balancing subpart and the common connection subpart is less than a distance between the second balancing subpart and the common connection subpart; and an overlapping part between the first electrode and the second electrode in the extending direction of the scan line has a first length in an extending direction of the data line, an overlapping part between the third electrode and the fourth electrode in the extending direction of the scan line has a second length in the extending direction of the data line, and the first length is less than or equal to the second length.

In some embodiments, the balancing capacitance part further includes a third balancing subpart and a fourth balancing subpart that are disposed corresponding to each of the subpixels; the third balancing subpart includes a fifth electrode and a sixth electrode, the fourth balancing subpart includes a seventh electrode and a eighth electrode; the fifth electrode and the seventh electrode are electrically connected to the subpixel electrode, the sixth electrode is electrically connected to one data line at one side of one of the subpixels, and the eighth electrode is electrically connected to another data line at another side of the one of the subpixels; in the extending direction of the scan line, the fifth electrode overlaps with the sixth electrode, and the seventh electrode overlaps with the eighth electrode.

In some embodiments, an overlapping part between the first electrode and the second electrode in the extending direction of the scan line has a first length in an extending direction of the data line, an overlapping part between the third electrode and the fourth electrode in the extending direction of the scan line has a second length in the extending direction of the data line, an overlapping part between the fifth electrode and the sixth electrode in the extending direction of the scan line has a third length in the extending direction of the data line, and an overlapping part between the seventh electrode and the eighth electrode in the extending direction of the scan line has a fourth length in the extending direction of the data line; and the first length is greater than or equal to the third length and the fourth length, and the second length is greater than or equal to the third length and the fourth length.

In some embodiments, the pixel electrode layer further includes a plurality of first shielding wires and a plurality of second shielding wires; an extending direction of the first shielding wires is parallel to an extending direction of the data line, two adjacent ones of the first shielding wires are connected by one of the second shielding wires; and an orthographic projection of one of the first shielding wires on the substrate overlaps with an orthographic projections of the data line on the substrate.

A display device is further provided by the present application, the display device includes the display panel in any one of the embodiments above and a device body, and the device body is integrated with the display panel.

Beneficial Effects

In the present application, the first electrode and the second electrode that form the first balancing subpart are connected to the main pixel electrode and one data line at one side of the subpixel, respectively. The third electrode and the fourth electrode that form the second balancing subpart are connected to the main pixel electrode and another data line at another side of the subpixel, respectively. When there are deviations in processes of a data line layer and the pixel electrode layer, the first balancing subpart and the second balancing subpart can be adopted to increase or decrease overlapping areas between the pixel electrode and the data lines, so as to increase or decrease coupling capacitance values between the pixel electrode and the data lines corresponding to the pixel electrode, so that a difference in coupling capacitance values between the pixel electrode and the data lines at both sides thereof can be reduced, thereby improving influence of picture crosstalk in the display panel and improving display effect.

DETAILED DESCRIPTION OF THE EMBODIMENT

Figure 1:
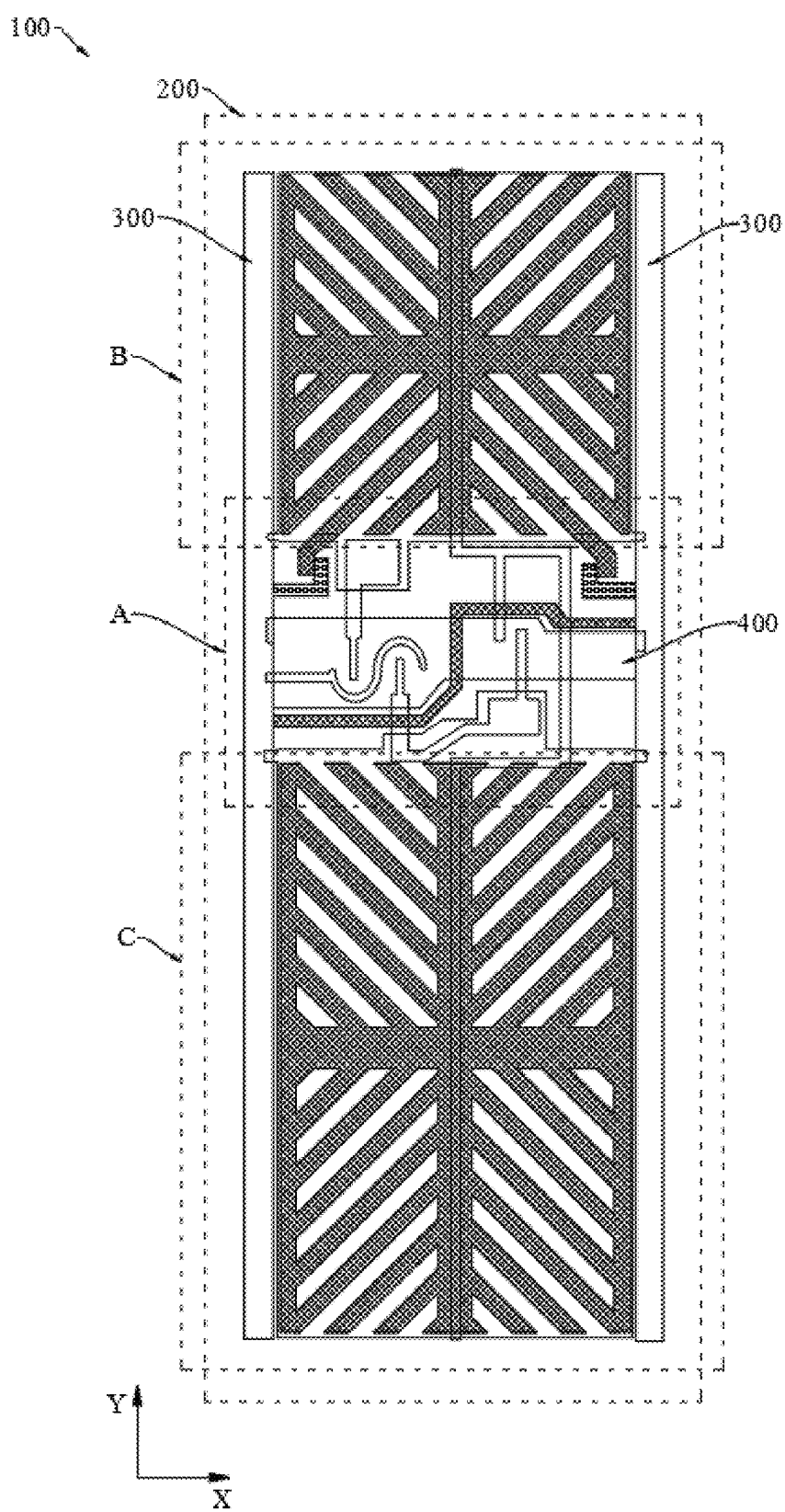
FIG. 1 is a schematic partial top view of a display panel provided by an embodiment of the present application.

The technical solutions in the embodiments of the present application will be clearly and completely described below in conjunction with the drawings in the embodiments of the present application. Obviously, the embodiments described are only a part of the embodiments of the present application, rather than all the embodiments. Based on the embodiments in the present application, all other embodiments obtained by those skilled in the art without creative works should be deemed as falling within the claims of the present application. In addition, it should be understood that detailed description of the embodiments described here are only used to illustrate and explain the present application, and are not intended to limit the present application. In the present application, in an absence of a statement to the contrary, orientation words such as "up" and "down" usually refer to up and down of a device in a state of actual use or working, specifically refer to directions in a plane in which the drawing is disposed, and "inside" and "outside" refer to a contour of the device.

In recent years, liquid crystal display panels still occupy a market share in consumer markets. At present, column inversion is adopted in most of display panels, so that coupling capacitance values of data lines to a pixel electrode can be offset by two data lines disposed at a left side and a right side thereof, so as to improve picture crosstalk. However, due to influence of process precision, thin film transistors and other factors, difference in coupling capacitance values between the pixel electrode and the data lines at both sides thereof is quite large, voltage variation of the pixel electrode can not be completely offset, thus resulting in picture crosstalk in the display panels.

Please refer to FIG. 1 to FIG. 9, a display panel 100 is provided by an embodiment of the present application, the display panel 100 includes:

a substrate;

a plurality of subpixels 200 disposed on the substrate and arranged in an array, each of the subpixels 200 is defined with a main area B and a subarea C, a data line 300 is disposed corresponding to the subpixels 200 in one column, and a scan line 400 is disposed corresponding to the subpixels 200 in one row;

a source-drain electrode part 500 disposed in a same layer as the data line 300;

a pixel electrode layer including a main pixel electrode 610 disposed corresponding to the main area B, and a subpixel electrode 620 disposed corresponding to the subarea C; and a balancing capacitance part including a first balancing subpart 710 and a second balancing subpart 720 that are disposed corresponding to each of the subpixels 200, the first balancing subpart 710 includes a first electrode 810 and a second electrode 820, the second balancing subpart 720 includes a third electrode 830 and a fourth electrode 840; the first electrode 810 and the third electrode 830 are electrically connected to the main pixel electrode 610, the second electrode 820 is electrically connected to one data line 300 at one side of the subpixel 200, and the fourth electrode 840 is electrically connected to another data line 300 at another side of the subpixel 200;

wherein, in the top view direction of the display panel 100, the balancing capacitance part does not overlap with the source-drain electrode part 500 in a direction from a layer in which the data line 300 is disposed to the pixel electrode layer; the first electrode 810 overlaps with the second electrode 820 in an extending direction of the scan line 400, and the third electrode 830 overlaps with the fourth electrode 840 in the extending direction of the scan line 400.

In the present application, the first electrode and the second electrode that form the first balancing subpart are connected to the main pixel electrode and one data line at one side of the subpixel, respectively. The third electrode and the fourth electrode that form the second balancing subpart are connected to the main pixel electrode and another data line at another side of the subpixel, respectively. When there are deviations in processes of a data line layer and the pixel electrode layer, the first balancing subpart and the second balancing subpart can be adopted to increase or decrease overlapping areas between the pixel electrode and the data lines, so as to increase or decrease coupling capacitance values between the pixel electrode and the data lines corresponding to the pixel electrode, so that a difference in coupling capacitance values between the pixel electrode and the data lines at both sides thereof can be reduced, thereby improving influence of picture crosstalk in the display panel and improving display effect.

Technical solutions of the present application are described in conjunction with specific embodiments.

Figure 2:
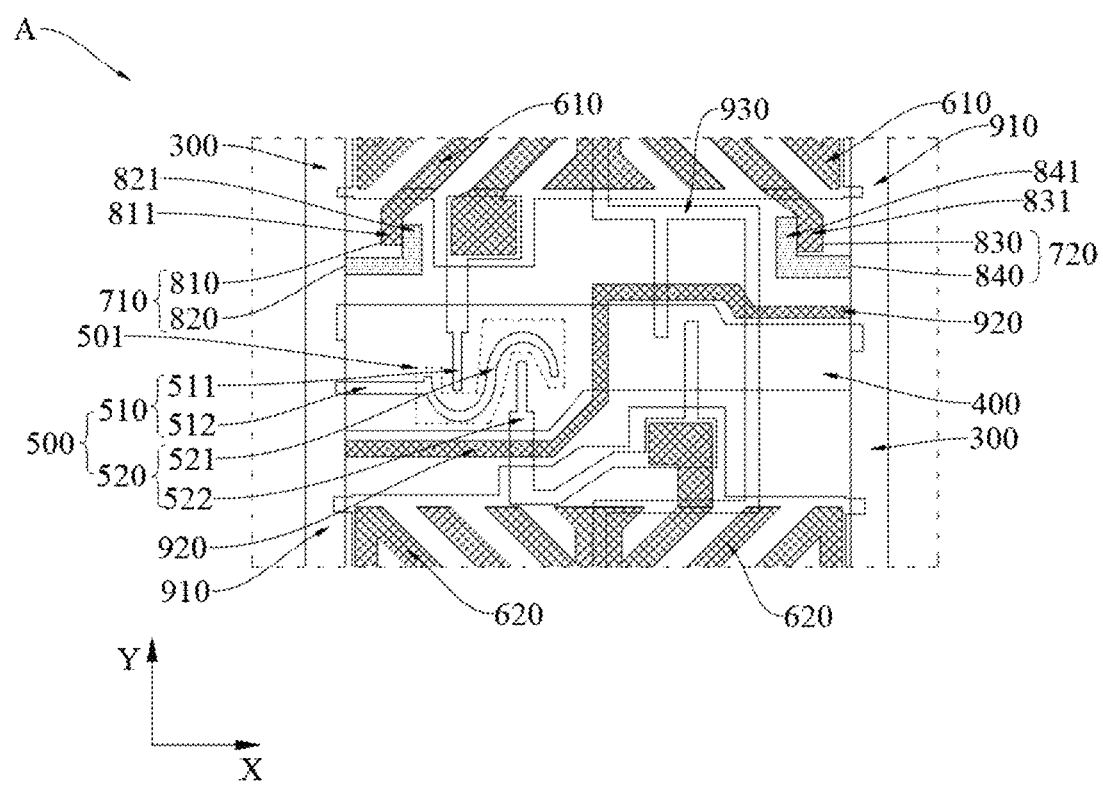
FIG. 2 is a first partial enlarged view of a region A in FIG. 1.

In this embodiment, please refer to FIG. 1 and FIG. 2, the display panel 100 includes the substrate, the plurality of subpixels 200 disposed on the substrate and arranged in an array, the source-drain electrode part 500, the pixel electrode layer, and the balancing capacitance part. Each of the subpixels 200 is defined with the main area B and the subarea C, the data line 300 is disposed corresponding to the subpixels 200 in one column, and the scan line 400 is disposed corresponding to the subpixels 200 in one row.

In FIG. 1 and FIG. 2, the extending direction of the scan line 400 is parallel to an X-axis, and an extending direction of the data lines 300 is parallel to a Y-axis. The subpixels 200 are arranged in an array along a direction of the X-axis and a direction of the Y-axis. For convenience of description, a left side refers to a negative direction of the X axis, a right side refers to a positive direction of the X axis, an upper side is a positive direction of the Y axis, and a lower side is a negative direction of the Y axis.

The source-drain electrode part 500 is disposed in a same layer as the data line 300. The pixel electrode layer includes the main pixel electrode 610 disposed corresponding to the main area B, and the subpixel electrode 620 disposed corresponding to the subarea C. The balancing capacitance part includes the first balancing subpart 710 and the second balancing subpart 720 that are disposed corresponding to each of the subpixels 200. The first balancing subpart 710 includes the first electrode 810 and the second electrode 820. The second balancing subpart 720 includes the third electrode 830 and the fourth electrode 840. The first electrode 810 and the third electrode 830 are electrically connected to the main pixel electrode 610. The second electrode 820 is electrically connected to one data line 300 at one side of the subpixel 200, and the fourth electrode 840 is electrically connected to another data line 300 at another side of the subpixel 200.

The balancing capacitance part does not overlap with the source-drain electrode part 500 in a direction from the layer in which the data line 300 is disposed to the pixel electrode layer. The first electrode 810 overlaps with the second electrode 820 in the direction of the X axis, and the third electrode 830 overlaps with the fourth electrode 840 in the direction of the X axis.

Figure 8:
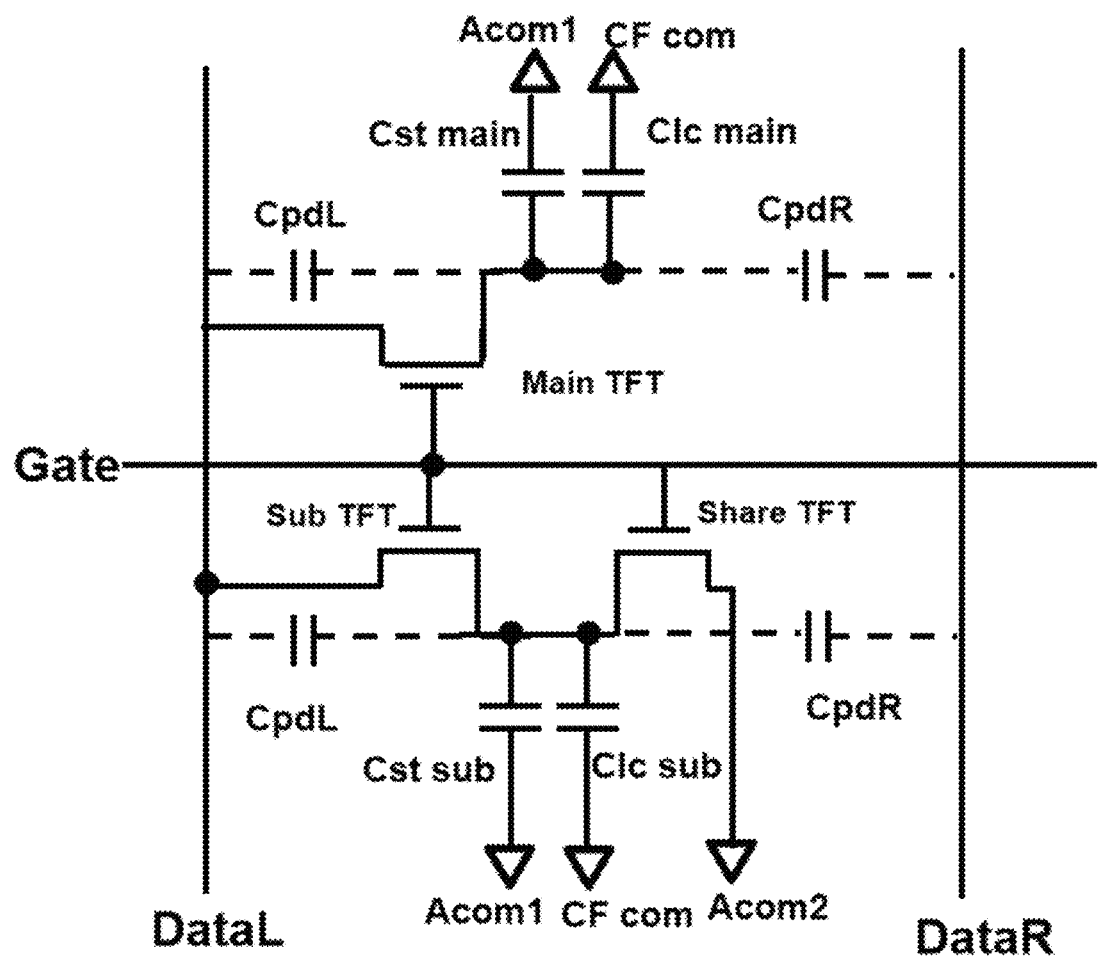
FIG. 8 is a schematic diagram of a circuit structure of a display panel provided by an embodiment of the present application.
Figure 9:
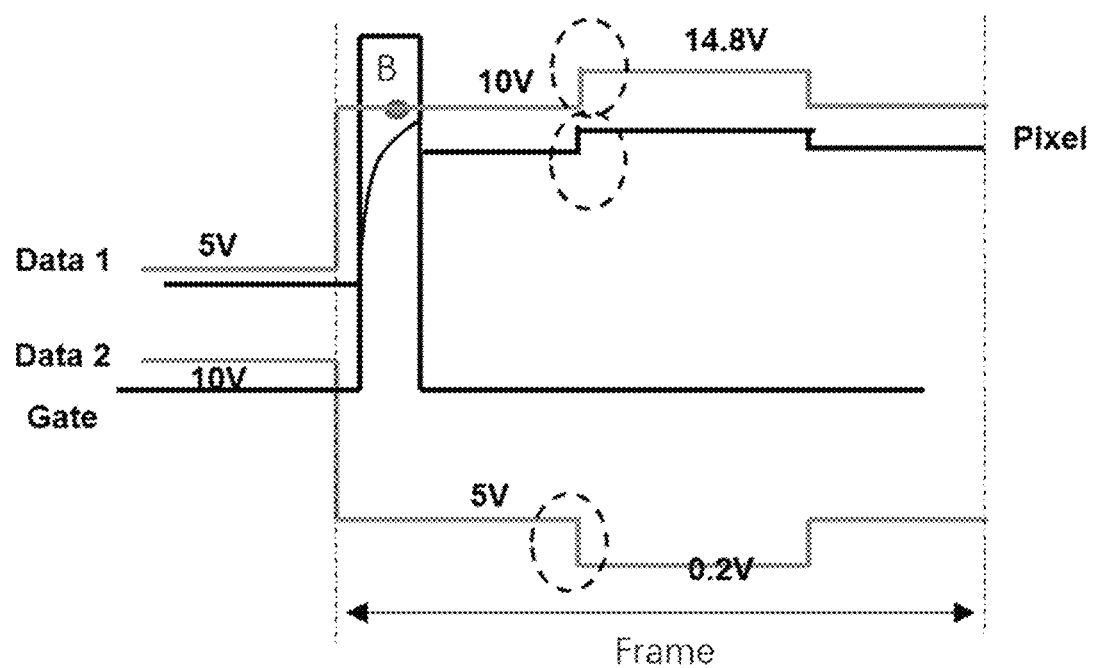
FIG. 9 is a schematic diagram of circuit voltages applied to a display panel provided by an embodiment of the present application.

Please refer to FIG. 8 and FIG. 9, a "main" represents a circuit structure corresponding to the main area B, and a "sub" represents a circuit structure corresponding to the subarea C. DataL represents a data lines 300 disposed at the left side of the subpixel 200, and DataR represents a data line 300 disposed at the right side of the subpixel 200. CpdLs represent coupling capacitances corresponding to the left side and between pixel electrodes (the main pixel electrode 610 and the subpixel electrode 620) and the DataL. Data1 represents a data line 300 transmitting a signal of positive polarity, Data2 represents a data line 300 transmitting a signal of negative polarity. CpdRs represent coupling capacitances corresponding to the right side and between the pixel electrodes (the main pixel electrode 610 and the subpixel electrode 620) and the DataR. Compared with the subpixel electrode 620, imbalance caused by difference between the CpdLs and the CpdRs has a greater impact on the main pixel electrode 610 of the main area B of the subpixel 200. When there are deviations in processes of the data line layer and the pixel electrode layer, for example, patterns of the pixel electrode layer shift along the positive direction of the X axis or the negative direction of the X axis, the first balancing subpart 710 and the second balancing subpart 720 can be adopted to increase or decrease the overlapping areas between the main pixel electrode 610 and the data lines 300 both sides thereof, so as to increase or decrease coupling capacitance values between the main pixel electrode 610 and the data lines corresponding to the main pixel electrode 610, so that the difference in coupling capacitance values between the main pixel electrode 610 and the data lines 300 at both sides thereof can be reduced, thereby improving influence of picture crosstalk in the display panel and improving display effect.

In some embodiments, please refer to FIG. 1 and FIG. 2, in the extending direction of the scan line 400, a portion of the second electrode 820 is disposed at a side of the first electrode 810 adjacent to the third electrode 830, and a portion of the fourth electrode 840 is disposed at a side of third electrode 830 adjacent to the first electrode 810. Herein, in the top view direction of the display panel 100, the first electrode 810 is in contact with the second electrode 820, and does not overlap with the second electrode 820 in the direction from the layer in which the data line 300 is disposed to the pixel electrode layer; and the third electrode 830 is in contact with the fourth electrodes 840, does not overlap with the fourth electrode 840 in the direction from the layer in which the data line 300 is disposed to the pixel electrode layer.

Patterning precisions of the data lines 300, the source-drain electrode part 500, and the pixel electrode layer are quite good, and the data lines 300, the source-drain electrode part 500, and the pixel electrode layer are formed at right positions. Overlapping areas between the data lines 300 and the pixel electrode layer, and between the source-drain electrode part 500 and the pixel electrode layer can balance the coupling capacitances between the pixel electrode and the data lines 300 at both sides thereof. There is no overlapping area between the first electrode 810 and the second electrode 820, and between the third electrode 830 and the fourth electrode 840 in the direction from the layer in which the data line 300 is disposed to the pixel electrode layer, so there is no need to perform balance and compensation between a left coupling capacitance and a right coupling capacitance, the left coupling capacitance is a coupling capacitance between the pixel electrode and the data line 300 at the left side thereof, and the right coupling capacitance is a coupling capacitance between the pixel electrode and the data line 300 at the right side thereof.

As shown in Table 1, in combination with FIG. 8 and FIG. 9, compared with a general structural in a comparison example, a difference in coupling capacitance values ΔCpd between the main pixel electrode 610 and the data lines 300 at both sides thereof and a difference in voltage ΔV of the main pixel electrode 610 of an experimental example 1 of this embodiment has been significantly improved.

TABLE 1

|  | comparative example | experimental example 1 |
|---|---|---|
| CpdL(fF) | 0.246 | 0.387 |
| CpdR(fF) | 0.165 | 0.362 |
| ΔCpd(fF) | 0.081 | 0.025 |
| ΔV(mV) | 0.41 | 0.13 |

Herein, The CpdL in Table 1 represents a coupling capacitance between the main pixel electrode 610 and the data line 300 disposed at the left side of the subpixel 200. The CpdR in Table 1 represents a coupling capacitance between the main pixel electrode 610 and the data line 300 disposed at the right side of the subpixel 200. For example, a coupling voltage of the data line 300 transmitting the signal of positive polarity to the pixel electrode is (14.8−10)*0.246/888=1.3 mV, a coupling voltage of the data line 300 transmitting the signal of negative polarity to the pixel electrode is (0.2−5)*0.165/888=0.89 mV. $C_{gs}+C_{LC}+C_{pd}+C_{st}$ is represented by a characteristic value 888. A dashed oval box in FIG. 9 represents a voltage jump. A formula for the difference in voltage ΔV is as follows:

$$\Delta V = \frac{\Delta C_{pd} \cdot (\Delta V\_\text{data})}{C_{gs} + C_{LC} + C_{pd} + C_{st}}$$

Figure 3:
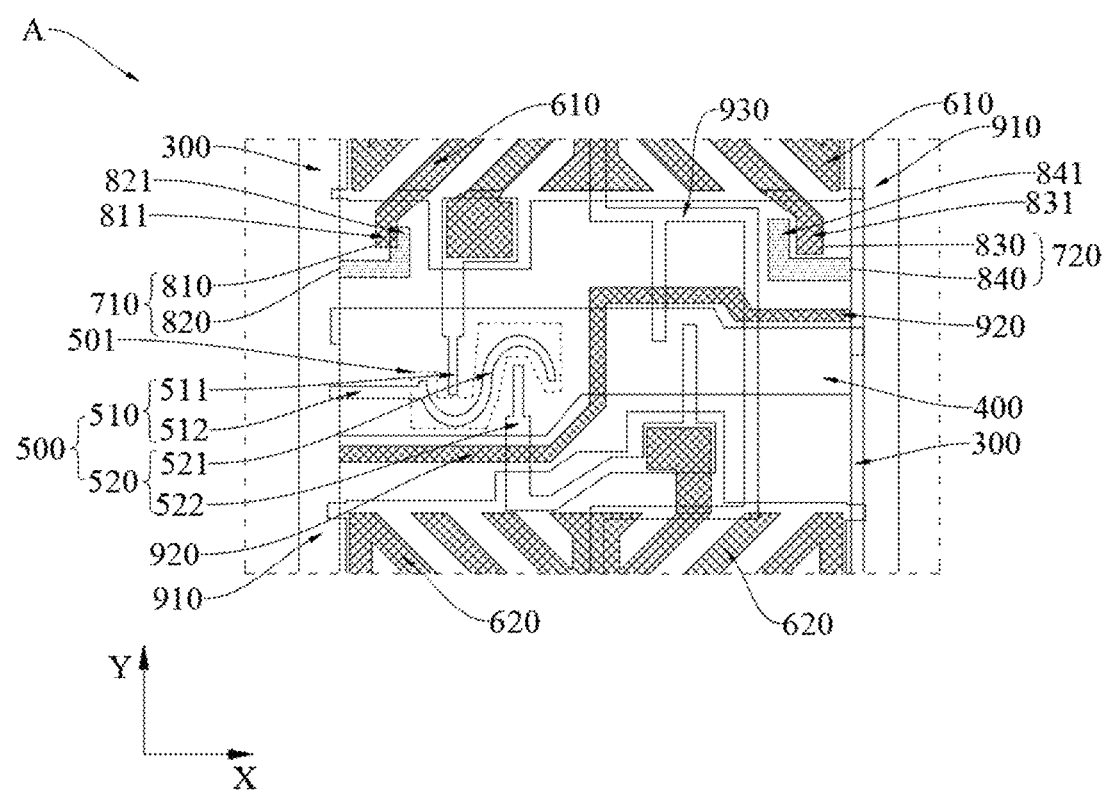
FIG. 3 is a second partial enlarged view of the region A in FIG. 1.
Figure 4:
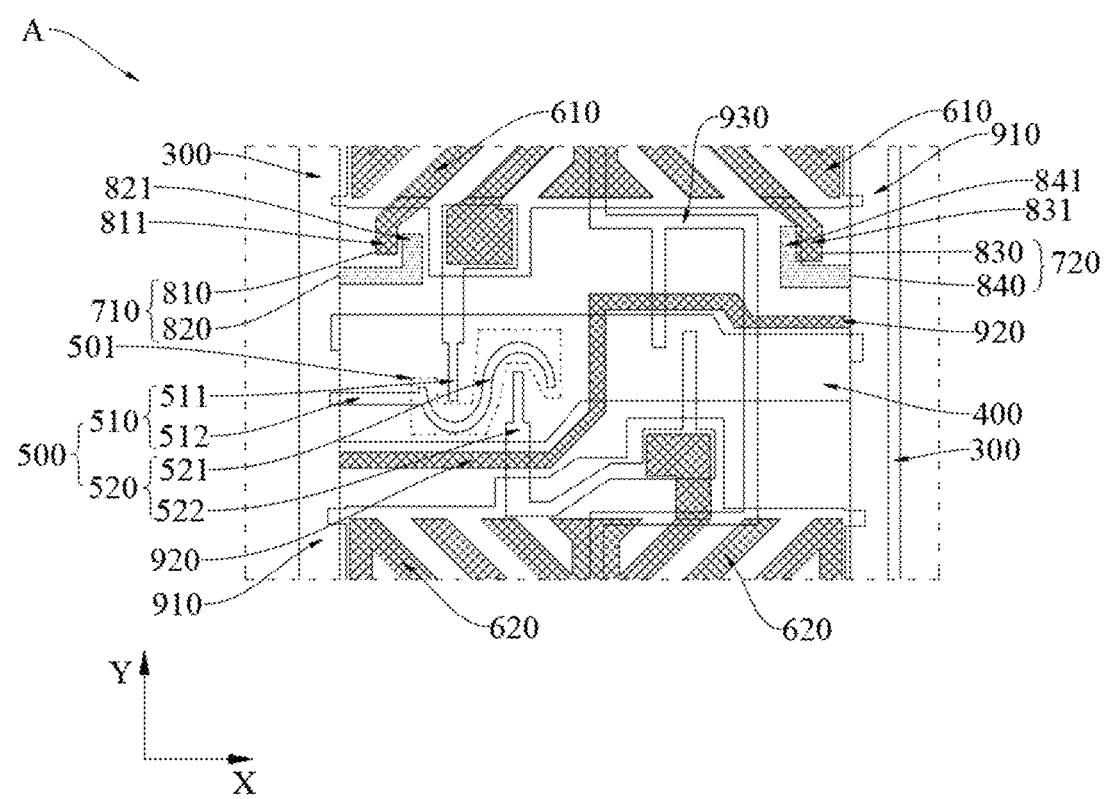
FIG. 4 is a third partial enlarged view of the region A in FIG. 1.

In some embodiments, please refer to FIG. 1, FIG. 3, and FIG. 4. In the extending direction of the scan line 400, the portion of the second electrode 820 is disposed at a side of the first electrode 810 adjacent to the third electrode 830; and the portion of the fourth electrode 840 is disposed at a side of the third electrode 830 adjacent to the first electrode 810. Herein, please refer to FIG. 3, In the top view direction of the display panel 100, the first electrode 810 overlaps with the second electrode 820 in the direction from the layer in which the data line 300 is disposed to the pixel electrode layer, and the third electrode 830 is spaced apart from the fourth electrode 840. Or, please refer to FIG. 4, in the top view direction of the display panel 100, the third electrode 830 overlaps with the fourth electrode 840 in the direction from the layer in which the data line 300 is disposed to the pixel electrode layer, and the first electrode 810 is spaced apart from the second electrode 820.

If the overlapping areas between the data lines 300 and the pixel electrode layer, and between the source-drain electrode part 500 and the pixel electrode layer can not balance the coupling capacitances between the pixel electrode and the data lines 300 at both sides thereof in a better way.

For example, the first electrode 810 is originally disposed at a left side of the portion of the second electrode 820 in the extending direction of the scan line 400, the first electrode 810 is in contact with the second electrode 820, and the first electrode 810 does not overlap with the second electrode 820 in the direction from the layer in which the data line 300 is disposed to the pixel electrode layer. The third electrode 830 is originally disposed at a right side of the portion of the fourth electrode 840 in the extending direction of the scan line 400, the third electrode 830 is in contact with the fourth electrode 840, and the third electrode 830 does not overlap with the fourth electrode 840 in the direction from the layer in which the data line 300 is disposed to the pixel electrode layer. However, please refer to FIG. 3, as the patterns of the pixel electrode layer as a whole shift along the positive direction of the X axis, the coupling capacitances between the pixel electrodes and the data line 300 at the left side thereof are needed to be compensated. In FIG. 3, the first electrode 810 overlaps with the second electrode 820 in the direction from the layer in which the data line 300 is disposed to the pixel electrode layer, and the third electrode 830 is spaced apart from the fourth electrode 840. As a result, the coupling capacitances between the pixel electrodes and the data line 300 at the left side thereof are increased, difference in coupling capacitance values between the pixel electrodes and the data lines 300 at both sides thereof can be reduced, thereby improving influence of picture crosstalk in the display panel and improving display effect.

As shown in Table 2, compared with the general structural in the comparison example, a difference in coupling capacitance values ΔCpd between the main pixel electrode 610 and the data lines 300 at both sides thereof and a difference in voltage ΔV of the main pixel electrode 610 of an experimental example 2 of this embodiment has been improved. Herein, the CpdL in Table 2 represents a coupling capacitance between the main pixel electrode 610 and the data line 300 disposed at the left side of the subpixel 200. The CpdR in Table 2 represents a coupling capacitance between the main pixel electrode 610 and the data line 300 disposed at the right side of the subpixel 200.

TABLE 2

|  | comparative example | experimental example 2 |
|---|---|---|
| CpdL(fF) | 0.297 | 0.329 |
| CpdR(fF) | 0.446 | 0.474 |
| ΔCpd(fF) | 0.149 | 0.145 |
| ΔV(mV) | 0.8 | 0.8 |

For example, the first electrode 810 is originally disposed at the left side of the portion of the second electrode 820 in the extending direction of the scan line 400, the first electrode 810 is in contact with the second electrode 820, and the first electrode 810 does not overlap with the second electrode 820 in the direction from the layer in which the data line 300 is disposed to the pixel electrode layer. The third electrode 830 is originally disposed at the right side of the portion of the fourth electrode 840 in the extending direction of the scan line 400, the third electrode 830 is in contact with the fourth electrode 840, and the third electrode 830 does not overlap with the fourth electrode 840 in the direction from the layer in which the data line 300 is disposed to the pixel electrode layer. However, please refer to FIG. 4, as the patterns of the pixel electrode layer as a whole shift along the negative direction of the X axis, the coupling capacitances between the pixel electrodes and the data line 300 at the right side thereof are needed to be compensated. In FIG. 4, the first electrode 810 is spaced apart from the second electrode 820, and the third electrode 830 overlaps with the fourth electrode 840 in the direction from the layer in which the data line 300 is disposed to the pixel electrode layer. As a result, the coupling capacitances between the pixel electrodes and the data line 300 at the right side thereof are increased, differences in coupling capacitance values between the pixel electrodes and the data lines 300 at both sides thereof can be reduced, thereby improving influence of picture crosstalk in the display panel and improving display effect.

As shown in Table 3, compared with the general structural in the comparison example, a difference in coupling capacitance values ΔCpd between the main pixel electrode 610 and the data lines 300 at both sides thereof and a difference in voltage ΔV of the main pixel electrode 610 of an experimental example 3 of this embodiment has been significantly improved. Herein, the CpdL in Table 3 represents a coupling capacitance between the main pixel electrode 610 and the data line 300 disposed at the left side of the subpixel 200. The CpdR in Table 3 represents a coupling capacitance between the main pixel electrode 610 and the data line 300 disposed at the right side of the subpixel 200.

TABLE 3

| Overlay 1 | comparative example | experimental example 3 |
| --- | --- | --- |
| CpdL(fF) | 0.381 | 0.425 |
| CpdR(fF) | 0.083 | 0.301 |
| ΔCpd(fF) | 0.298 | 0.124 |
| ΔV(mV) | 1.6 | 0.67 |

Figure 5:
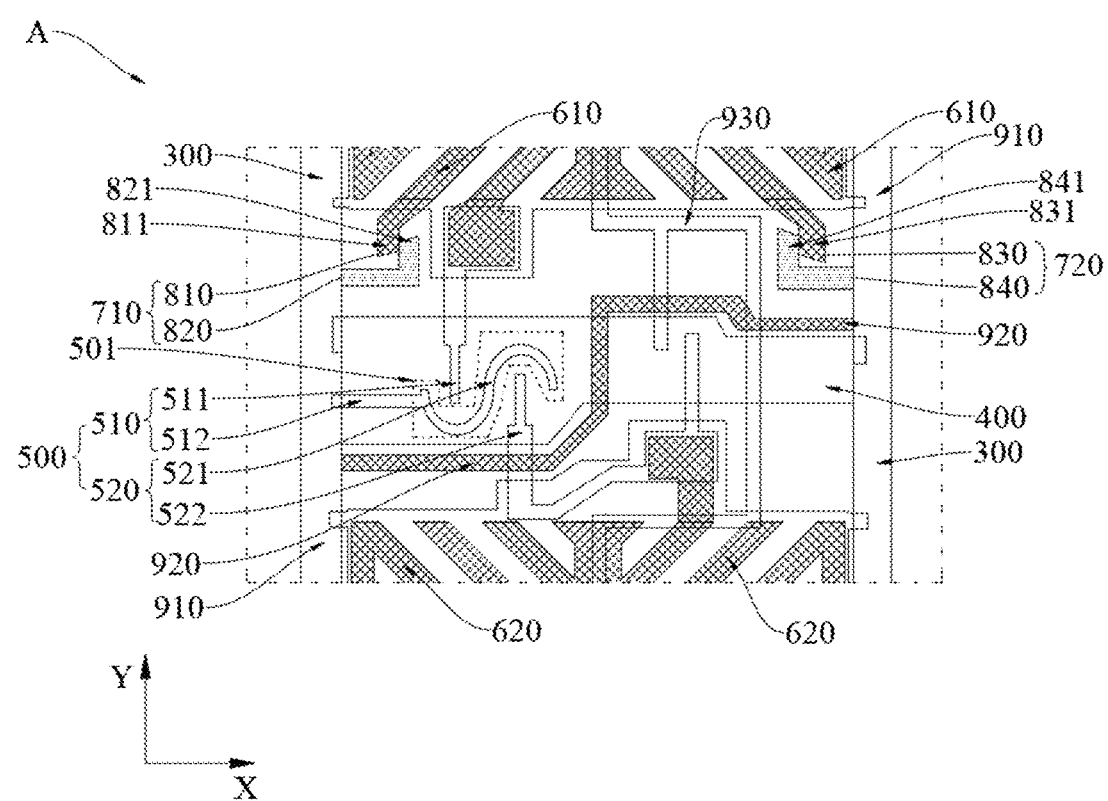
FIG. 5 is a fourth partial enlarged view of the region A in FIG. 1.

In some embodiments, please refer to FIG. 1 and FIG. 5. In the top view direction of the display panel 100, in the extending direction of the scan line 400, a first portion 811 of the first electrode 810 overlaps with a second portion 821 of the second electrode 820 and is disposed at a side of the second portion 821 away from the second balancing subpart 720; and third portion 831 of the third electrode 830 overlaps with a forth portion 841 of the fourth electrode 840 and is disposed at a side of the forth portion 841 away from the first balancing subpart 710.

In a same subpixel 200, in the plan view direction of the display panel 100, from a center of the subpixel 200 to a direction perpendicular to corresponding ones of the data lines 300, a length of the first portion 811 in the extending direction of the data line 300 gradually increases in a direction away from the second portion 821, a length of the second portion 821 in the extending direction of the data line 300 gradually decreases in a direction adjacent to the first portion 811, a length of the third portion 831 in the extending direction of the data line 300 gradually increases in a direction away from the fourth portion 841, and a length of the fourth portion 841 in the extending direction of the data line 300 gradually decreases in a direction adjacent to the third portion 831.

When the first portion 811 and the second part 821 are relatively close to overlap with each other, a facing area of the first electrode 810 and the second electrode 820 is increased, so as to increase a capacitance of the first balancing subpart 710. From the center of the subpixel 200 to the direction perpendicular to the corresponding ones of the data lines 300, the length of the first portion 811 in the extending direction of the data line 300 gradually increases in a direction away from the second portion 821, and the length of the second portion 821 in the extending direction of the data line 300 gradually decreases in a direction adjacent to the first portion 811. As a result, in a process that the first portion 811 and the second portion 821 are relatively close to overlap with each other, an increase in speed of the facing area between the first portion 811 and the second portion 821 is faster and faster, that is, it is not a uniform linear increase, so that a speed at which the first balancing subpart 710 compensates capacitance can be increased, and a risk of a sudden overcompensation of the first balancing subpart 710 at a beginning of overlapping between the first portion 811 and the second portion 821 can also be reduced.

When the third part 831 and the fourth part 841 are relatively close to overlap with each other, a facing area between the third electrode 830 and the fourth electrode 840 is increased, so as to increase a capacitance of the second balancing subpart 720. From the center of the subpixel 200 to the direction perpendicular to the corresponding ones of the data lines 300, the length of the third portion 831 in the extending direction of the data line 300 gradually increases in a direction away from the fourth portion 841, and the length of the fourth portion 841 in the extending direction of the data line 300 gradually decreases in a direction adjacent to the third portion 831. As a result, in a process that the third portion 831 and the fourth portion 841 are relatively close to overlap with each other, an increase in speed of the facing area between the third portion 831 and the fourth portion 841 is faster and faster, that is, it is not a uniform linear increase, so that a speed at which the second balancing subpart 720 compensates capacitance can be increased, and a risk of a sudden overcompensation of the second balancing subpart 720 at a beginning of overlapping between the third portion 831 and the fourth portion 841 can also be reduced.

Figure 6:
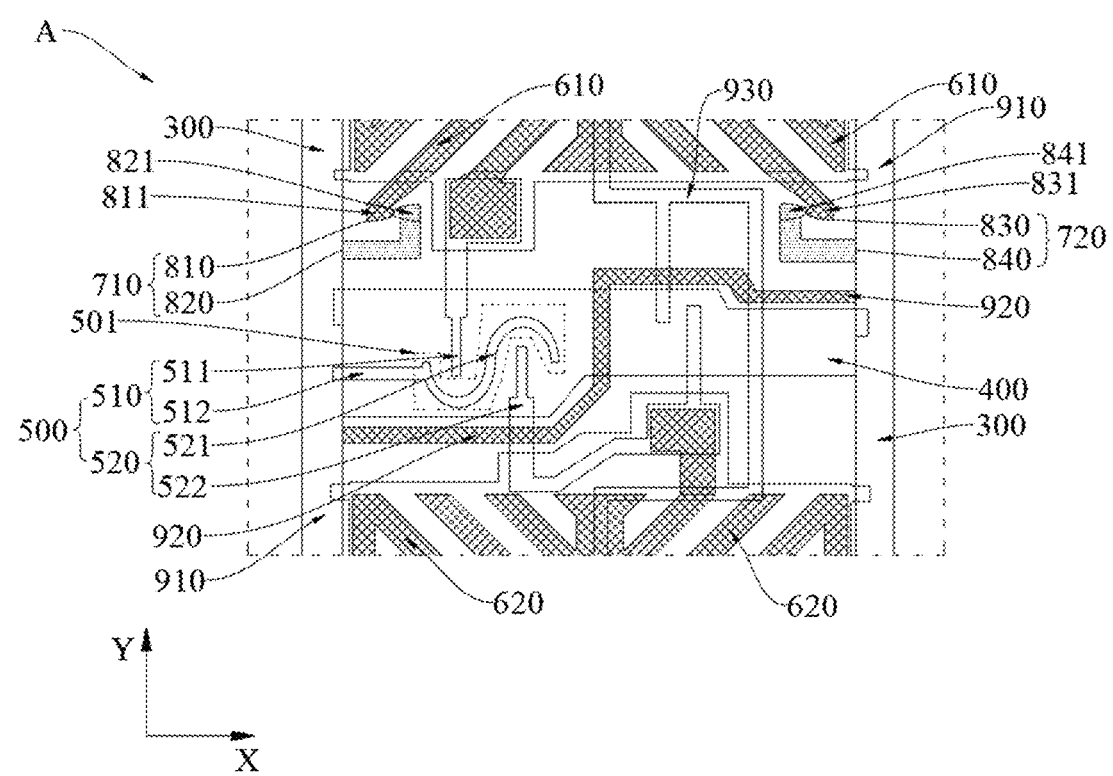
FIG. 6 is a fifth partial enlarged view of the region A in FIG. 1.

In some embodiments, please refer to FIG. 1 and FIG. 6, in the top view direction of the display panel 100, outlines of the first portion 811, the second portion 821, the third portion 831, and the fourth portion 841 include arc shape.

The arc shape may be a semi-circular arc shape or a semi-elliptical arc shape, so that transition of increases in capacitance between the first portion 811 and the second portion 821, and between the third portion 831 and the fourth portion 841 are smoother, thereby improving a problem that capacitances change too fast. When the arc shape is the semi-elliptical arc shape, a short axis of the semi-ellipse is parallel to the extension direction of the data line 300, the semi-elliptical arc-shapes of corresponding ones of the electrodes abut against each other, which can make full use of a space in the direction of the Y axis and increase maximum overlap area, thereby increasing a capacitance of the maximum balance compensation. A short axis of the semi-circular arc shape is perpendicular to the extension direction of the data line 300, which can reduce a risk of sudden excessive capacitance compensation at the beginning of overlapping.

In some embodiments, please refer to FIG. 1 and FIG. 2, the source-drain electrode part 500 includes a first source-drain electrode subpart 510 and a second source-drain electrode subpart 520. The first source-drain electrode subpart 510 is correspondingly connected to the main pixel electrode 610, the second source-drain electrode subpart 520 is correspondingly connected to the subpixel electrode 620. The first source-drain electrode subpart 510 and the second source-drain electrode subpart 520 include a common connection subpart 501 being shared by the first source-drain electrode subpart 510 and the second source-drain electrode subpart 520. In the top view direction of the display panel 100, an overlapping part between the first electrode 810 and the second electrode 820 in the extending direction of the scan line 400 has a first length in the extending direction of the data line 300, and an overlapping part between the third electrode 830 and the fourth electrode 840 in the extending direction of the scan line 400 has a second length in the extending direction of the data line 300.

A distance between the first balancing subpart 710 and the common connection subpart 501 is less than a distance between the second balancing subpart 720 and the common connection subpart 501. The first length is less than or equal to the second length.

The first source-drain electrode subpart 510 includes a first source 511 and a first drain 512. The first drain 512 is electrically connected to the data line 300, the first source 511 is electrically connected to the main pixel electrode 610. The first source 511 and the first drain 512 are electrically connected to each other by a voltage applied to a gate. The second source-drain electrode subpart 520 includes a second source 521 and a second drain electrode 522. The second drain 522 is electrically connected to the subpixel electrode 620. The second source 521 and the second drain 522 are electrically connected to each other by the voltage applied to the gate. The first drain 512 and the second source 521 are electrically connected to each other and are integrated. The common connection subpart 501 includes the first drain 512 and the second source 521.

Compared with the second balancing subpart 720, the first balancing subpart 710 is more adjacent to the common connection subpart 501. Generally, the common connection subpart 501 is disposed adjacent to the data line 300 at the left side of the subpixel, an impact of dislocation and shift of patterning of the pixel electrode layer on a left side coupling capacitance is weaker than on a right side coupling capacitance. Therefore, a balance compensation capacitance corresponding to the right side coupling capacitance, and an increasing rate of a capacitor of the second balancing subpart 720 are increased. When the pixel electrode layer as a whole shifts left or right by one unit distance, the variation compensation capacitance of the capacitor of the second balancing subpart 720 is greater, thereby improving balance compensation for the coupling capacitance at the right side, which is more conducive to reducing the difference in coupling capacitance values between the pixel electrode and the data lines 300 at both sides thereof, thereby improving influence of picture crosstalk in the display panel and improving display effect.

Figure 7:
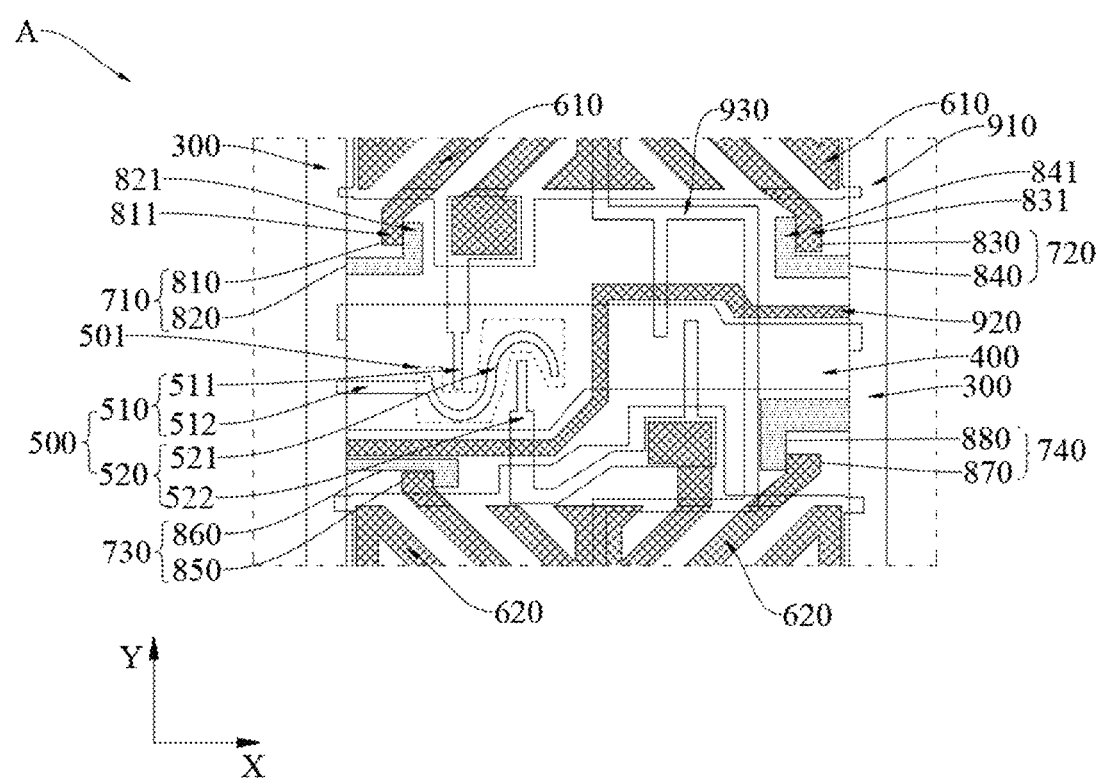
FIG. 7 is a sixth partial enlarged view of the region A in FIG. 1.

In some embodiments, please refer to FIG. 1 and FIG. 7, the balancing capacitance part further includes a third balancing subpart 730 and a fourth balancing subpart 740 that are disposed corresponding to each of the subpixels 200. The third balancing subpart 730 includes a fifth electrode 850 and a sixth electrode 860. The fourth balancing subpart 740 includes a seventh electrode 870 and a eighth electrode 880. The fifth electrode 850 and the seventh electrode 870 are electrically connected to the subpixel electrode 620. The sixth electrode 860 is electrically connected to one data line 300 at one side of one of the subpixels 200, and the eighth electrode 880 is electrically connected to another data line 300 at another side of the one of the subpixels 200.

In the plan view direction of the display panel 100, in the extending direction of the scan line 400, the fifth electrode 850 overlaps with the sixth electrode 860, and the seventh electrode 870 overlaps with the eighth electrode 880.

Similarly, for the subpixel electrode 620 of the subpixel 200, when there are deviations in the processes of the data line layer and the pixel electrode layer, for example, patterns of the pixel electrode layer shift along the positive direction or the negative direction of the X axis, the third balancing subpart 730 and the fourth balancing subpart 740 can increase or decrease overlapping areas between the subpixel electrode 620 and corresponding ones of the data lines, so as to increase or decrease coupling capacitance values between the subpixel electrode 620 and corresponding ones of the data lines, so that the difference in coupling capacitance values between the subpixel electrode 620 and the data lines 300 at both sides thereof can be reduced, thereby improving influence of picture crosstalk in the display panel and improving display effect.

In some embodiments, please refer to FIG. 1 and FIG. 7. In the plan view direction of the display panel 100, an overlapping part between the first electrode 810 and the second electrode 820 in the extending direction of the scan line 400 has a first length in an extending direction of the data line 300, an overlapping part between the third electrode 830 and the fourth electrode 840 in the extending direction of the scan line 400 has a second length in the extending direction of the data line 300, an overlapping part between the fifth electrode 850 and the sixth electrode 860 in the extending direction of the scan line 400 has a third length in the extending direction of the data line 300, and an overlapping part between the seventh electrode 870 and the eighth electrode 880 in the extending direction of the scan line 400 has a fourth length in the extending direction of the data line 300.

The first length is greater than or equal to the third length and the fourth length, and the second length is greater than or equal to the third length and the fourth length.

Compared with the subpixel electrode 620, imbalance in coupling capacitance at the left and right sides of the pixel electrodes has a greater impact on the main pixel electrode 610 of the main area B of the subpixel 200. When the pixel electrode layer as a whole shifts left or right by one unit distance, variation compensation capacitances of capacitors of the first balancing subpart 710 and the second balancing subpart 720 are greater, so as to emphatically improve compensation balance of the coupling capacitances between the main pixel electrode 610 and the data lines, which is more conducive to reducing a difference in coupling capacitance values between the main pixel electrode 610 and the data lines at both sides thereof, thereby improving influence of picture crosstalk in the display panel and improving display effect.

In some embodiments, please refer to FIG. 1 and FIG. 2, the pixel electrode layer further includes a plurality of first shielding wires 910 and a plurality of second shielding wires 920. Herein, an extending direction of the first shielding wires 910 is parallel to the extending direction of the data line 300. Two adjacent first shielding wires 910 are connected by the second shielding wires 920. An orthographic projection of the first shielding wires 910 on the substrate overlaps with an orthographic projections of the data line 300 on the substrate.

In some embodiments, please refer to FIG. 1 and FIG. 2, the display panel 100 further includes a sharing electrode 930. The sharing electrode 930 passes through the main area B and the subarea C. The source-drain electrode part 500 further includes a third source-drain electrode subpart, the third source-drain electrode subpart includes a third source and a third drain. The third source and the second drain 522 are electrically connected to each other and are integrated. The third source is electrically connected to the subpixel electrode 620. The third drain and the sharing electrode 930 are electrically connected to each other and are integrated. A part of voltage of the subpixel electrode 620 can be divided to the sharing electrode 930, so as to realize difference in pixel voltage between the main area B and the subarea C, thereby generating difference in rotation angle of the liquid crystal molecules and improving viewing angle.

In some embodiments, the display panel 100 further includes a liquid crystal layer, a color filter layer, and upper and lower polarizing layers.

In the present application, the first electrode and the second electrode that form the first balancing subpart are connected to the main pixel electrode and one data line at one side of the subpixel, respectively. The third electrode and the fourth electrode that form the second balancing subpart are connected to the main pixel electrode and another data line at another side of the subpixel, respectively. When there are deviations in processes of the data line layer and the pixel electrode layer, the first balancing subpart and the second balancing subpart can be adopted to increase or decrease the overlapping areas between the pixel electrode and the data lines, so as to increase or decrease the coupling capacitance values between the pixel electrode and the data lines corresponding to the pixel electrode, so that the difference in coupling capacitance values between the pixel electrode and the data lines at both sides thereof can be reduced, thereby improving influence of picture crosstalk in the display panel and improving display effect.

Figure 10:
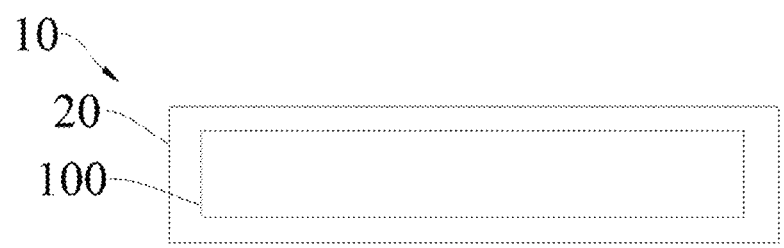
FIG. 10 is a schematic structural diagram of a display device provided by an embodiment of the present application.

Please refer to FIG. 10, an embodiment of the present application further provides a display device 10 including any one of the display panels 100 mentioned above and a device body 20, and the device body 20 is integrated with the display panel 100.

For specific structures of the display panel 100, please refer to any one of the embodiments and drawings of the display panel 100 mentioned above, which is not repeated herein.

In this embodiment, the device body 20 may include a middle frame, a frame glue, etc. The display device 10 may be a display terminal such as a mobile phone, a flat panel, a television, and etc., which is not limited herein.

In some embodiments, the display device 10 further includes a backlight unit corresponding to the display panel.

The embodiments of the present application discloses the display panel and the display device, the display panel includes the main pixel electrode, the data line, the scan line, and the balancing capacitance part. The balancing capacitance part includes the first balancing subpart and the second balancing subpart which are disposed corresponding to each of the subpixels. The first balancing subpart includes the first electrode and the second electrode that are connected to the main pixel electrode and one data line at one side of the subpixel, respectively. The second balancing subpart includes the third electrode and the fourth electrode that are connected to the main pixel electrode and another data line at another side of the subpixel, respectively. When there are deviations in processes of the data line layer and the pixel electrode layer, the first balancing subpart and the second balancing subpart can be adopted to increase or decrease the overlapping areas between the pixel electrode and the data lines, so as to increase or decrease the coupling capacitance values between the pixel electrode and the data lines corresponding to the pixel electrode, so that the difference in coupling capacitance values between the pixel electrode and the data lines at both sides thereof can be reduced, thereby improving influence of picture crosstalk in the display panel and improving display effect.

The display panel and the display device provided in the embodiments of the present application have been introduced in detail above, specific examples are used to illustrate principles and implementations in the specification of the present application, the description of the embodiments mentioned above is only used to help understand methods and core ideas of the present application. Meanwhile, for those skilled in the art, based on ideas of the present application, there will be changes in specific implementations and application scope. In summary, contents of the specification should not be understood as limiting the present application.

What is claimed is:

1. A display panel, comprising:
a substrate, wherein the substrate is provided with a plurality of subpixel areas arranged in an array, and each of the plurality of subpixel areas comprises a main area and a subarea spaced from the main area;
a data line disposed corresponding to the subpixel areas in one column;
a scan line disposed corresponding to the subpixel areas in one row;
a pixel electrode layer comprising a main pixel electrode disposed in the main area, and a subpixel electrode disposed in the subarea; and
a balancing capacitance part comprising a first balancing subpart and a second balancing subpart disposed in the area between the main pixel electrode and the subpixel electrode, wherein the first balancing subpart comprises a first electrode and a second electrode adjacent to each other, the second balancing subpart comprises a third electrode and a fourth electrode adjacent to each other; the first electrode and the third electrode are electrically connected to the main pixel electrode, and the second electrode and the fourth electrode are electrically connected to two adjacent data lines, respectively.

2. The display panel of claim 1, wherein in an extending direction of the scan line, a portion of the second electrode is disposed at a side of the first electrode adjacent to the third electrode, and a portion of the fourth electrode is disposed at a side of the third electrode adjacent to the first electrode;
wherein the first electrode is in contact with the second electrode, and does not overlap with the second electrode in a direction from a layer in which the data line is disposed to the pixel electrode layer;
the third electrode is in contact with the fourth electrode, and does not overlap with the fourth electrode in the direction from the layer in which the data line is disposed to the pixel electrode layer.

3. The display panel of claim 1, wherein in an extending direction of the scan line, a portion of the second electrode is disposed at a side of the first electrode adjacent to the third electrode, and a portion of the fourth electrode is disposed at a side of the third electrode adjacent to the first electrode; and wherein the first electrode overlaps with the second electrode in a direction from the layer in which the data line is disposed to the pixel electrode layer, and the third electrode is spaced apart from the fourth electrode.

4. The display panel of claim 1, wherein in an extending direction of the scan line, a portion of the second electrode is disposed at a side of the first electrode adjacent to the third electrode, and a portion of the fourth electrode is disposed at a side of the third electrode adjacent to the first electrode; and wherein the third electrode overlaps with the fourth electrode in a direction from the layer in which the data line is disposed to the pixel electrode layer, and the first electrode is spaced apart from the second electrode.

5. The display panel of claim 1, wherein in an extending direction of the scan line, a first portion of the first electrode overlaps with a second portion of the second electrode and is disposed at a side of the second portion away from the second balancing subpart, and a third portion of the fourth electrode overlaps with a forth portion of the fourth electrode and the third portion is disposed at a side of the forth portion away from the first balancing subpart; and wherein in one of the subpixel areas, a length of the first portion in an extending direction of the data line gradually increases in a direction away from the second portion, a length of the second portion in the extending direction of the data line gradually decreases in a direction adjacent to the first portion, a length of the third portion in the extending direction of the data line gradually increases in a direction away from the fourth portion, and a length of the fourth portion in the extending direction of the data line gradually decreases in a direction adjacent to the third portion.

6. The display panel of claim 5, wherein outlines of the first portion, the second portion, the third portion, and the fourth portion comprise arc shape.

7. The display panel of claim 1, further comprising a source-drain electrode part spaced from the balancing capacitance part, wherein the source-drain electrode part comprises a first source-drain electrode subpart and a second source-drain electrode subpart; the first source-drain electrode subpart is correspondingly connected to the main pixel electrode, the second source-drain electrode subpart is correspondingly connected to the subpixel electrode; the first source-drain electrode subpart and the second source-drain electrode subpart comprise a common connection subpart being shared by the first source-drain electrode subpart and the second source-drain electrode subpart, and a distance between the first balancing subpart and the common connection subpart is less than a distance between the second balancing subpart and the common connection subpart; and wherein an overlapping part between the first electrode and the second electrode in an extending direction of the scan line has a first length in an extending direction of the data line, an overlapping part between the third electrode and the fourth electrode in the extending direction of the scan line has a second length in the extending direction of the data line, and the first length is less than or equal to the second length.

8. The display panel of claim 1, wherein the balancing capacitance part further comprises a third balancing subpart and a fourth balancing subpart disposed in the area between the main pixel electrode and the subpixel electrode; the third balancing subpart comprises a fifth electrode and a sixth electrode adjacent to each other, the fourth balancing subpart comprises a seventh electrode and a eighth electrode adjacent to each other; the fifth electrode and the seventh electrode are electrically connected to the subpixel electrode, the sixth electrode and the eighth electrode are electrically connected to two adjacent data lines, respectively.

9. The display panel of claim 8, wherein an overlapping part between the first electrode and the second electrode in an extending direction of the scan line has a first length in an extending direction of the data line, an overlapping part between the third electrode and the fourth electrode in the extending direction of the scan line has a second length in the extending direction of the data line, an overlapping part between the fifth electrode and the sixth electrode in the extending direction of the scan line has a third length in the extending direction of the data line, and an overlapping part between the seventh electrode and the eighth electrode in the extending direction of the scan line has a fourth length in the extending direction of the data line; and wherein the first length is greater than or equal to the third length and the fourth length, and the second length is greater than or equal to the third length and the fourth length.

10. The display panel of claim 1, wherein the pixel electrode layer further comprises a plurality of first shielding wires and a plurality of second shielding wires; an extending direction of the first shielding wires is parallel to an extending direction of the data line, two adjacent ones of the first shielding wires are connected by one of the second shielding wires; and an orthographic projection of one of the first shielding wires on the substrate overlaps with an orthographic projections of the data line on the substrate.

11. A display device, comprising a display panel, and the display panel comprising:

a substrate, wherein the substrate is provided with a plurality of subpixel areas arranged in an array, and each of the plurality of subpixel areas comprises a main area and a subarea spaced from the main area;

a data line disposed corresponding to the subpixel areas in one column;

a scan line disposed corresponding to the subpixel areas in one row;

a pixel electrode layer comprising a main pixel electrode disposed in the main area, and a subpixel electrode disposed in the subarea; and a balancing capacitance part comprising a first balancing subpart and a second balancing subpart disposed in an area between the main pixel electrode and the subpixel electrode, wherein the first balancing subpart comprises a first electrode and a second electrode adjacent to each other, the second balancing subpart comprises a third electrode and a fourth electrode adjacent to each other; the first electrode and the third electrode are electrically connected to the main pixel electrode, and the second electrode and the fourth electrode are electrically connected to two adjacent data lines, respectively.

12. The display device of claim 11, wherein in an extending direction of the scan line, a portion of the second electrode is disposed at a side of the first electrode adjacent to the third electrode, and a portion of the fourth electrode is disposed at a side of the third electrode adjacent to the first electrode;

wherein the first electrode is in contact with the second electrode, and does not overlap with the second electrode in a direction from a layer in which the data line is disposed to the pixel electrode layer;

the third electrode is in contact with the fourth electrode, and does not overlap with the fourth electrode in the direction from the layer in which the data line is disposed to the pixel electrode layer.

13. The display device of claim 11, wherein in an extending direction of the scan line, a portion of the second electrode is disposed at a side of the first electrode adjacent to the third electrode, and a portion of the fourth electrode is disposed at a side of the third electrode adjacent to the first electrode; and wherein the first electrode overlaps with the second electrode in a direction from the layer in which the data line is disposed to the pixel electrode layer, and the third electrode is spaced apart from the fourth electrode.

14. The display device of claim 11, wherein in an extending direction of the scan line, a portion of the second electrode is disposed at a side of the first electrode adjacent to the third electrode, and a portion of the fourth electrode is disposed at a side of the third electrode adjacent to the first electrode; and wherein the third electrode overlaps with the fourth electrode in a direction from the layer in which the data line is disposed to the pixel electrode layer, and the first electrode is spaced apart from the second electrode.

15. The display device of claim 11, wherein in an extending direction of the scan line, a first portion of the first electrode overlaps with a second portion of the second electrode and is disposed at a side of the second portion away from the second balancing subpart, and a third portion of the third electrode overlaps with a forth portion of the fourth electrode and is disposed at a side of the forth portion away from the first balancing subpart; and wherein in one of the subpixel areas, a length of the first portion in an extending direction of the data line gradually increases in a direction away from the second portion, a length of the second portion in the extending direction of the data line gradually decreases in a direction adjacent to the first portion, a length of the third portion in the extending direction of the data line gradually increases in a direction away from the fourth portion, and a length of the fourth portion in the extending direction of the data line gradually decreases in a direction adjacent to the third portion.

16. The display device of claim 15, wherein outlines of the first portion, the second portion, the third portion, and the fourth portion comprise arc shape.

17. The display device of claim 11, further comprising a source-drain electrode part spaced from the balancing capacitance part, wherein the source-drain electrode part comprises a first source-drain electrode subpart and a second source-drain electrode subpart; the first source-drain electrode subpart is correspondingly connected to the main pixel electrode, the second source-drain electrode subpart is correspondingly connected to the subpixel electrode; the first source-drain electrode subpart and the second source-drain electrode subpart comprise a common connection subpart being shared by the first source-drain electrode subpart and the second source-drain electrode subpart, and a distance between the first balancing subpart and the common connection subpart is less than a distance between the second balancing subpart and the common connection subpart; and wherein an overlapping part between the first electrode and the second electrode in an extending direction of the scan line has a first length in an extending direction of the data line, an overlapping part between the third electrode and the fourth electrode in the extending direction of the scan line has a second length in the extending direction of the data line, and the first length is less than or equal to the second length.

18. The display device of claim 11, wherein the balancing capacitance part further comprises a third balancing subpart and a fourth balancing subpart disposed in the area between the main pixel electrode and the subpixel electrode; the third balancing subpart comprises a fifth electrode and a sixth electrode adjacent to each other, the fourth balancing subpart comprises a seventh electrode and a eighth electrode adjacent to each other; the fifth electrode and the seventh electrode are electrically connected to the subpixel electrode, the sixth electrode and the eighth electrode are electrically connected to the two adjacent data lines, respectively.

19. The display device of claim 18, wherein an overlapping part between the first electrode and the second electrode in an extending direction of the scan line has a first length in an extending direction of the data line, an overlapping part between the third electrode and the fourth electrode in the extending direction of the scan line has a second length in the extending direction of the data line, an overlapping part between the fifth electrode and the sixth electrode in the extending direction of the scan line has a third length in the extending direction of the data line, and an overlapping part between the seventh electrode and the eighth electrode in the extending direction of the scan line has a fourth length in the extending direction of the data line; and wherein the first length is greater than or equal to the third length and the fourth length, and the second length is greater than or equal to the third length and the fourth length.

20. The display device of claim 11, wherein the pixel electrode layer further comprises a plurality of first shielding wires and a plurality of second shielding wires; an extending direction of the first shielding wires is parallel to an extending direction of the data line, two adjacent ones of the first shielding wires are connected by one of the second shielding wires; and an orthographic projection of one of the first shielding wires on the substrate overlaps with an orthographic projections of the data line on the substrate.

* * * * *